US012456866B2

(12) United States Patent
Pereda Torres et al.

(10) Patent No.: US 12,456,866 B2
(45) Date of Patent: Oct. 28, 2025

(54) MULTI-PORT POWER CONVERTER AND ASSOCIATED SYSTEM AND USE

(71) Applicant: PONTIFICIA UNIVERSIDAD CATOLICA DE CHILE, Santiago (CL)

(72) Inventors: Javier Eduardo Pereda Torres, Santiago (CL); Sebastián Felipe Neira Castillo, Santiago (CL)

(73) Assignee: PONTIFICIA UNIVERSIDAD CATOLICA DE CHILE, Santiago (CL)

( * ) Notice: Subject to any disclaimer, the term of this patent is extended or adjusted under 35 U.S.C. 154(b) by 133 days.

(21) Appl. No.: 18/557,188

(22) PCT Filed: Apr. 26, 2021

(86) PCT No.: PCT/CL2021/050033
§ 371 (c)(1),
(2) Date: Oct. 25, 2023

(87) PCT Pub. No.: WO2022/226669
PCT Pub. Date: Nov. 3, 2022

(65) Prior Publication Data
US 2024/0204526 A1    Jun. 20, 2024

(51) Int. Cl.
*H02J 3/38*        (2006.01)
*H02J 3/32*        (2006.01)
(Continued)

(52) U.S. Cl.
CPC .................. *H02J 3/38* (2013.01); *H02J 3/32* (2013.01); *H02M 1/0095* (2021.05);
(Continued)

(58) Field of Classification Search
CPC ...... H02M 1/008; H02M 1/0095; H02M 1/10; H02M 1/12; H02J 3/32; H02J 3/38–50
See application file for complete search history.

(56) References Cited

U.S. PATENT DOCUMENTS 9,071,141 B2    6/2015  Dong
9,859,814 B2    1/2018  Harrison
(Continued)

FOREIGN PATENT DOCUMENTS

CN           105591559 A   *  5/2016
WO    WO-2016138949 A1   *  9/2016   ............ H02M 3/158

OTHER PUBLICATIONS

M. Rouhani and G. J. Kish, "Multiport DCâDCâAC Modular Multilevel Converters for Hybrid AC/DC Power Systems," Jul. 9, 2019, in IEEE Transactions on Power Delivery, vol. 35, No. 1, pp. 408-419, Feb. 2020 (Year: 2019).*

(Continued)

*Primary Examiner* — Rexford N Barnie
*Assistant Examiner* — David A Shiao
(74) *Attorney, Agent, or Firm* — FisherBroyles, LLP; Jason P. Mueller

(57) ABSTRACT

The invention relates to a multi-port power converter and a power conversion system that implements the power converter of the invention to connect at least two elements in direct current (DC) with at least one element in alternating current (AC) using a single simultaneous conversion stage. Furthermore, the invention relates to the use of the power conversion system.

14 Claims, 5 Drawing Sheets

(51) Int. Cl.
  *H02M 1/00* (2006.01)
  *H02M 3/158* (2006.01)
  *H02M 7/797* (2006.01)
  *H02M 1/12* (2006.01)

(52) U.S. Cl.
  CPC ......... *H02M 3/1586* (2021.05); *H02M 7/797* (2013.01); *H02J 2300/24* (2020.01); *H02J 2300/30* (2020.01); *H02M 1/12* (2013.01)

(56) References Cited

U.S. PATENT DOCUMENTS

| | | | |
|---|---|---|---|
| 10,263,456 B1 | 4/2019 | Wang | |
| 2010/0198421 A1* | 8/2010 | Fahimi | H02J 3/381 700/291 |
| 2012/0307531 A1* | 12/2012 | Toliyat | H02M 5/4585 363/36 |
| 2013/0099565 A1* | 4/2013 | Sachs | H02J 3/46 307/25 |
| 2014/0375122 A1* | 12/2014 | Papastergiou | H02J 3/36 307/18 |
| 2015/0003115 A1* | 1/2015 | Barron | H02M 3/33507 363/17 |
| 2015/0061569 A1* | 3/2015 | Alexander | B60L 53/63 320/109 |
| 2020/0144934 A1* | 5/2020 | Chen | H02M 7/53803 |
| 2020/0366236 A1* | 11/2020 | Xu | H02J 3/32 |
| 2022/0224244 A1* | 7/2022 | Tamasas Elrais | H02M 3/33569 |

OTHER PUBLICATIONS

A. R. Tarango and G. J. Kish, "State-Space Dynamic Model of Unified MMC Structure for Hybrid AC/DC Grids," Nov. 9, 2020, 2020 IEEE Electric Power and Energy Conference (EPEC), Edmonton, AB, Canada, 2020, pp. 1-8 (Year: 2020).*
English machine translation of WO2016138949A1 published Sep. 9, 2016. (Year: 2016).*
English machine translation of CN105591559A published May 18, 2016 (Year: 2016).*
Neira, S. et al., "Three-Port Full-Bridge Bidirectional Converter for Hybrid DC/DC/AC Systems", IEEE Transactions on Power Electronics, (20201200), vol. 35, No. 12, doi:10.1109/TPEL.2020. 2990667, pp. 13077-13084, XP011802912.
Neira, S. et al., "A Novel Three-Port NPC Converter for Grid-Tied Photovoltaic Systems with Integrated Battery Energy Storage", 2020 IEEE 11th International Symposium on Power Electronics for Distributed Generation Systems (PEDG, (20200000), doi:10.1109/ PEDG48541.2020.9244383, pp. 104-109, XP033854256.
Zhang, N. et al., "A review of topologies of three-port DC-DC converters for the integration of renewable energy and energy storage system", Renewable & Sustainable Energy Reviews, vol. 56, doi:10.1016/j.rser.2015.11.079, (20160400), pp. 388-401, URL: https://ro.uow.edu.au/eispapers/5149, (Oct. 12, 2021), XP029387107.

* cited by examiner

MULTI-PORT POWER CONVERTER AND ASSOCIATED SYSTEM AND USE

CROSS REFERENCE

This application is a national stage entry application under 35 U.S.C. 371 of PCT Patent Application No. PCT/CL2021/050033, filed Apr. 26, 2021, the entire contents of which are incorporated herein by reference.

The invention relates to a multi-port power converter and a power conversion system implementing the power converter of the invention to connect at least two elements in direct current (DC) with at least one element in alternating current (AC), using a single simultaneous conversion stage.

More particularly, the invention refers to a power converter that comprises three bidirectional ports allowing the connection of power sources and loads according to the requirements of each application. In addition, the use of the conversion system is defined in different applications that require the connection of at least two DC elements with at least one AC element.

BACKGROUND

In recent years, the number of hybrid electrical applications or systems which are configured to handle the interaction of different electrical sources and/or loads, such as photovoltaic systems, batteries, fuel cells and the electrical grid, has increased exponentially. In this context, a growing interest has been generated in the development of power converters with the challenge of meeting the multiple functionalities required when connecting different electrical sources and/or loads in the same system, for example, connecting a photovoltaic system to the grid or including energy storage systems in a grid-connected photovoltaic generation system.

Among the solutions proposed to address these challenges are those that use multiple power conversion stages as interfaces with different electrical sources and/or loads stand out. For example, Patent U.S. Ser. No. 10/056,847B2 shows a solution for connecting multiple DC sources through a system of individual converters connected to the grid through a traditional inverter. Currently, such systems with multiple power conversion stages are widely used. However, the main problem with this type of system is the high number of components that make it up which in addition to making its construction more expensive affects its reliability and total efficiency.

On the other hand, there is a group of solutions that optimize DC step-up conversion through the use of high-efficiency resonant topologies, thereby improving the extraction of power from a DC source, an array of solar panels, the interaction with energy storage units and another DC source/load. However, this group of solutions has a very efficient and optimal first conversion stage in terms of volume, but they require a second stage for connection to the grid which reduces its efficiency and considerably increases the complexity of the system.

In view of the above, there is a need for a power conversion system that implements a unified conception of the power conversion necessary when connecting multiple electrical sources and/or loads, such as solar panels and energy storage units, to the grid.

Additionally, when sizing a residential photovoltaic installation (small installation), the generation feasibility and its potential are subject to a minimum of photovoltaic modules connected in series (string) or to a second step-up converter to deliver the necessary operating voltage to the inverter so as to be connected to the grid or load. In this sense, depending on the use that will be given to the generated energy and taking into account the law of each country, such as the so-called Net Billing, it is estimated that in many cases the optimal operation is self-consumption and not the sale of energy to the grid which means lower power installations and the feasibility of storing energy with batteries. However, the use of batteries requires an additional converter so if solar generation and energy storage are desired, special hybrid inverters or at least 2 conventional converters are required.

In this context, the invention seeks to be an efficient alternative for solar generation and energy storage systems connected to the grid by proposing a single simultaneous power conversion stage to regulate the interaction between the three elements of said systems. Additionally, according to one embodiment, the proposed converter allows connecting photovoltaic systems, batteries or low voltage fuel cells to the grid without the need for an additional step-up converter, so that the solution can be implemented in low-medium power systems exhibiting three fundamental benefits:

Reduction of investment costs, by reducing the quantity of necessary equipment, installation and transportation costs are reduced.

Reduction of operating costs, by reducing the probability of failures due to the smaller number of components.

Increase in income received, due to high efficiency and ability to provide complementary services to the grid.

Then, the invention has multiple applications in the industries of electricity generation, energy storage and even transportation, being specially designed to be part of multiple types of electrical systems, including photovoltaic generation systems with integrated energy storage, photovoltaic generation systems with two independent photovoltaic systems, photovoltaic generation systems with integrated voltage boost, electric generation systems for fuel cells with integrated battery support and battery systems connected to the alternating current grid with integrated voltage boost. Additionally, the system allows one of the DC ports to be used with a capacitor that absorbs power ripple when the AC port is single-phase relieving the other DC port of stress. Furthermore, as a result of its multifunctionality, the power converter of the invention also has application in electric vehicles that incorporate hydrogen fuel cells, for example.

Having said the above, the invention is described below in relation to its essential characteristics, preferred embodiments and technical problems that are sought to be solved compared with similar solutions.

DESCRIPTION OF THE INVENTION

The invention relates to a multi-port power converter which comprises an array of power transistors and three bidirectional ports to connect at least two direct current (DC) elements, such as a photovoltaic system and a battery array with at least one element in alternating current (AC), such as the electrical grid using a single simultaneous power conversion stage. Furthermore, the invention refers to a power conversion system that implements said power converter together with two DC elements and one AC element that together form different types of electrical systems.

Through the invention, with the ability to use a single simultaneous power conversion stage, that is, wherein the power conversion between the bidirectional ports of the converter occurs at the same time or simultaneously, the complexity of the power converter topology is reduced, and the power density is improved compared to those solutions that implement multiple conversion stages. Furthermore, as each of the ports is bidirectional, it allows the connection of power sources and loads according to the requirements of each application.

The power converter of the invention derives from a traditional topology called Full-Bridge with the inclusion of an array of inductors to generate a second DC port. According to one embodiment, said second DC port allows the connection of a low voltage element (for example, photovoltaic systems, batteries or fuel cells) with the AC electrical grid without the need to include an additional voltage boosting stage. Consequently, the present invention allows power conversion to be carried out between three ports minimizing the total devices required which increases the power density of the converter.

The operation of the power converter of the invention is associated with a multivariable control subsystem which regulates in a coupled manner the states of the active devices present in the topology. The control subsystem delivers voltage signals to be generated with each branch of the converter and thereby generates the on and off signals of the power transistors. The multivariable control subsystem generates voltage signals based on the instantaneous power requirements in each of the converter ports. In this way, the conversion system can be used in different electrical conversion scenarios where the interaction of at least two DC elements with an AC port is required. Examples of this type of systems are off-grid and on-grid photovoltaic generation systems with energy storage, photovoltaic systems with two arrays of photovoltaic modules, photovoltaic generation systems or batteries with integrated voltage boost and mobility or electric traction systems with hybrid energy sources, among others.

Consequently, the set of the power converter topology of the invention with the proposed control allows generating a multifunctional three-port power conversion system with multiple advantages, including high power density by minimizing the number of power transistors and associated passive elements; bidirectional capability in power flows from all ports and; integrated voltage boost for one of the DC ports.

In particular, the invention proposes a power conversion system that comprises a multi-port power converter comprising an array of power transistors and three bidirectional ports to connect at least two elements in direct current (DC) with at least one element in alternating current (AC). The three bidirectional ports are a first DC port configured to connect to a first DC element, a second DC port configured to connect to a second DC element, and an AC port configured to connect to at least one element in AC. The first DC port is connected to the AC port using a Full-Bridge topology and the second DC port is connected to the DC port using an interleaved Half-Bridge topology (Buck-Boost type). Furthermore, the power converter of the invention comprises a multivariable control subsystem able to control the current in the three bidirectional ports through voltage signals to be generated with each branch of the power converter and through on and off signals of each of the power transistors of the power transistor array, wherein the voltage signals are generated based on instantaneous power requirements in each of the three bidirectional ports. Finally, the power converter of the invention comprises at least one arrangement of inductors wherein each inductor is connected between the AC port and the second DC port, wherein each inductor is subjected to a sinusoidal voltage of magnitude and frequency predetermined through the AC port and the second DC port.

In this way, the power converter of the invention is configured to connect the at least one AC element with the at least two DC elements in a single simultaneous power conversion stage.

On the other hand, the invention also comprises a multi-port power conversion system, characterized in that it comprises the multi-port power converter defined above, an AC element connected to the AC port of the power converter and two DC elements, wherein a first DC element is connected to the first DC port of the power converter and a second DC element is connected to the second DC port of the power converter. According to the invention, the first DC port of the converter is connected to the AC port of the converter through a Full-Bridge topology, and the second DC port of the converter is connected to the first DC port of the converter through an interleaved Half-Bridge topology (Buck-Boost). The currents in the three bidirectional ports and applied to the DC and AC elements are controlled by the multivariable control subsystem of the power converter, as indicated above. Then, according to the system of the invention, each inductor of the inductors array is connected between the AC port and the second DC port, so that each inductor is subjected to a sinusoidal voltage of magnitude and frequency predetermined by the AC port and the second DC port and consequently, the power converter connects the AC element with the two DC elements in a single simultaneous power conversion stage.

According to a first preferred embodiment of the invention, each inductor of the at least one array of inductors is a coupled inductor. In this context, the at least one arrangement of coupled inductors when subjected to the sinusoidal voltage, introduces inverse coupling between magnetic fluxes that are generated between the AC port and the second DC port, increasing the impedance associated with the at least one AC element and reducing a circulating electric current generated during the operation of the power converter. The present first preferred embodiment not only allows adding an additional DC port in a standard DC-AC converter without increasing the number of power transistors required but, by including an array of coupled inductors connected in parallel with the AC output of the converter, also allows there to be a magnetic coupling of the inductors that reduces the magnitude of the currents associated with the second DC port to an acceptable level for the active and passive components of the converter.

In particular, the incorporation of coupled inductors according to the first preferred embodiment makes it possible to reduce the magnitude of the circulating currents of the converter which do not contribute to the power transfer, and only increase the conduction and switching losses. On a real operating scale (residential or industrial) said circulating currents are high, so by reducing them the converter of the present invention has competitive efficiencies with current commercial solutions.

The basis of the first preferred embodiment associated with the coupled inductors, is to take advantage of the magnetic fluxes generated by the voltages of each branch of the converter, to influence the circulating current generated by these same voltages. This is due to the fact that each branch of the converter is subjected to a sinusoidal voltage of magnitude and frequency determined by the AC port and the DC port connected to the AC port through the inductors, which are 180° out of phase with each other in the single-phase application (120° in three-phase application and 360°/N in N-phases polyphase applications). In this way, the generated flows have the same phase shift and by including the inverse coupling between them it is possible to increase the impedance associated with the AC element and reduce the magnitude of said current. This translates into an approximately 2% improvement in converter efficiency over the entire operating range.

On the other hand, according to a second preferred embodiment of the invention, the multivariable control subsystem comprises at least one modulation stage, for example, by means of a modulator. Said modulation stage allows setting a harmonic spectrum of an output voltage of the power converter at predetermined values, so that the at least one modulation stage receives the voltage signals to be generated with each branch of the power converter and by means of the modulation generates the on and off signals of the power transistors.

The advantage of implementing a modulation stage in the control subsystem is to reduce the amplitude of the converter's output frequency spectrum, avoiding the use of complex, expensive and bulky filters in practical applications. Indeed, the modulation stage allows the harmonic spectrum of the output voltage to be set in target values, defined as predetermined. The above means a reduction of the low frequency harmonic content and a specific location for the relevant harmonics, so that they can be easily filtered to comply with the connection standards of this type of converters.

In addition, the multivariable control subsystem allows the regulation of power flows between the three ports of the converter, by coupled generation of voltage signals for each branch of the converter. The main novelty of this approach is the joint use of differential and common mode components to control the currents of each port. The above allows using all the available degrees of freedom of the conversion system, which implies that the power converter of the invention is able to use the minimum number of active components for the connection of the at least three elements.

At this point it is important to highlight that the first and second preferred embodiments can be implemented together, complementing the advantages associated with each of them.

On the other hand, according to alternative embodiments of the invention, the power converter can be implemented in a single-phase conversion system, the power converter comprising four transistors and two inductors or in a three-phase conversion system, the power converter comprising six transistors and three inductors or in a polyphase system in general, comprising the power converter 2 multiplied by N transistors and N inductors.

Furthermore, according to embodiments associated with the application of the invention, the at least one AC element may be one or a combination of the electrical grid, an AC motor, an AC generator, an AC load or an AC source; while the first DC element and/or the second DC element may be one or a combination of photovoltaic systems, batteries, capacitors, ultracapacitors, fuel cells, DC microgrids, DC loads or DC sources. It is important to highlight that, in the context of the invention, a photovoltaic system may comprise a photovoltaic cell, a photovoltaic module or panel, a photovoltaic string (modules connected in series) or a photovoltaic array depending on each application.

Another preferred embodiment of the invention involves that the second DC port is decoupled from the AC port and therefore, it allows the connection of a low voltage DC element compared to the first DC port. As highlighted above, all the embodiments of the invention can complement each other being exclusive only if explicitly indicated.

Finally, the invention also refers to the use of the power conversion system, wherein said system is useful to configure, among others:
- a photovoltaic generation system with energy storage, where the AC element is an AC load or source, the first DC element is one or more batteries, and the second DC element is one or more photovoltaic systems;
- a photovoltaic generation system with two photovoltaic systems, where the AC element is an AC load or source, the first DC element is a first photovoltaic system, and the second DC element is a second photovoltaic system;
- a photovoltaic or battery generation system with integrated voltage boost, where the AC element is an AC load or source, the first DC element is one or more photovoltaic systems or one or more batteries and the second DC element is one or an arrangement of capacitors that allows the voltage set up to be completed, a fuel cell electrical generation system with integrated battery support, where the AC element is an AC source or load, the first DC element is one or more batteries, and the second DC element is one or more fuel cells; and
- a hydrogen fuel cell electric vehicle, where the AC element is an AC machine, source or load, the first DC element is one or more batteries or ultracapacitors of the vehicle and the second DC element is one or more hydrogen fuel cells of the vehicle.

BRIEF DESCRIPTION OF THE FIGURES

As part of the present invention, the following representative figures are exhibited which show preferred embodiments of the invention and, therefore, should not be considered as limitations to the definition of the claimed subject matter.

DETAILED DESCRIPTION OF A PREFERRED EMBODIMENT

Figure 1A:
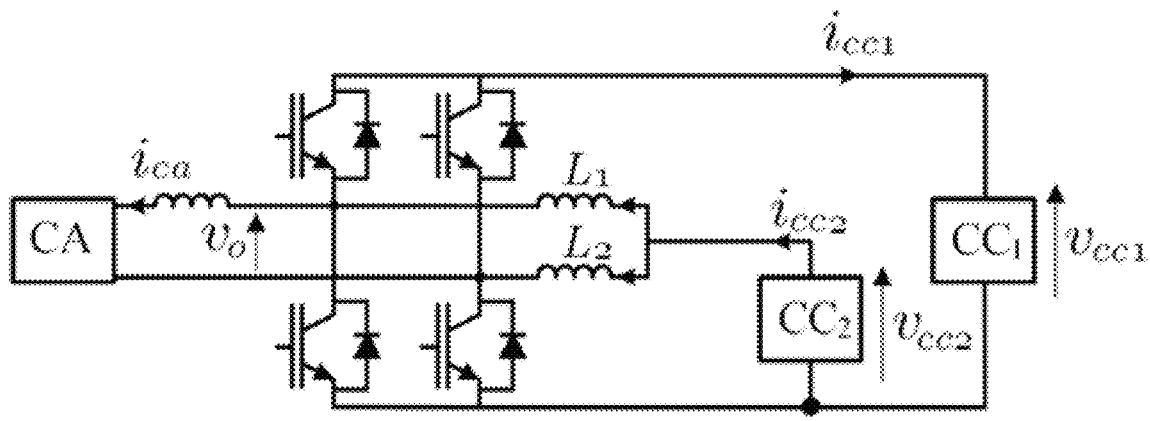
FIG. 1a shows a diagram of the power converter topology according to an embodiment of the invention in a single-phase conversion system.
Figure 1B:
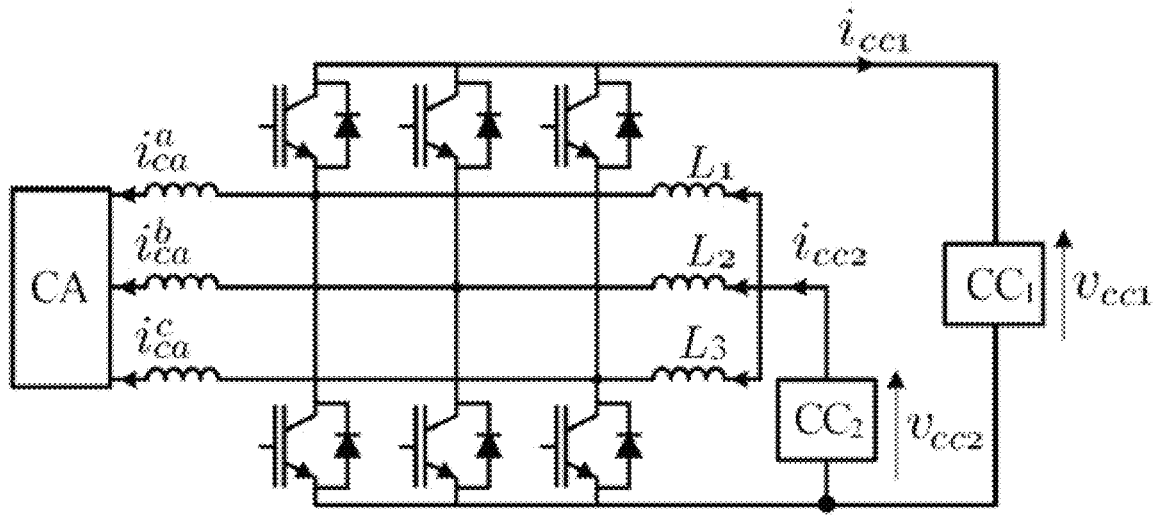
FIG. 1b shows a diagram of the power converter topology according to an embodiment of the invention in a three-phase conversion system.
Figure 1C:
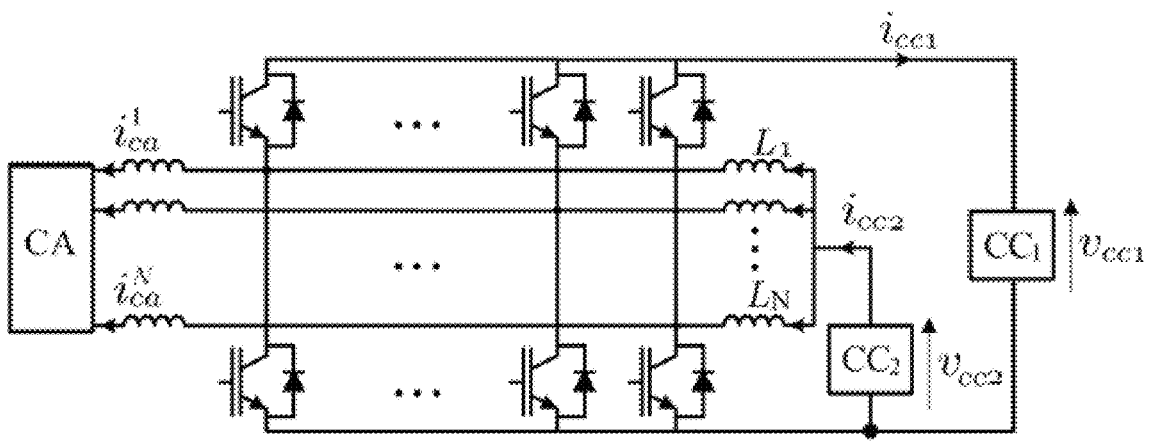
FIG. 1c shows a diagram of the power converter topology according to an embodiment of the invention in a polyphase conversion system.

FIGS. 1a, 1b and 1c show diagrams of the power converter topology according to one embodiment of the invention which incorporates inductor arrangements without coupling, implemented in single-phase, three-phase and polyphase systems, respectively. In particular, FIG. 1c shows the application of the power converter in a polyphase system with N phases, where N may be an integer greater than or equal to 2. As can be seen, when N=3 the system is a three-phase system, like the one in FIG. 1b. The single-phase and three-phase systems are illustrated independently in FIGS. 1a and 1b considering that they are the most used in the industry.

In this regard, with reference to FIG. 1a, a power converter is shown in a single-phase application. Said power converter comprises a transistor array formed by four transistors, an inductor array formed by two inductors ($L_1$, $L_2$) without coupling, an alternating current (AC) port and a first direct current port ($DC_1$) and a second direct current port ($DC_2$). Referring to FIG. 1b, a power converter is shown in a three-phase application. Said power converter comprises a transistors array formed by six transistors, an inductor array formed by three inductors ($L_1$, $L_2$, $L_3$) without coupling, an alternating current (AC) port and a first direct current port ($CC_1$) and a second direct current port ($CC_2$). Finally, with reference to FIG. 1c, a power converter in an N-phase polyphase application. Said power converter comprises a transistor array formed by 2*N transistors, an inductor array formed by N inductors ($L_1$, ..., LN) without coupling, an alternating current (AC) port and a first direct current port DC ($DC_1$) and a second direct current port DC ($DC_2$).

In FIGS. 1a, 1b and 1c the DC ports ($DC_1$, $DC_2$) may be represented by direct current elements, such as photovoltaic systems, batteries, capacitors, ultracapacitors, fuel cells and DC microgrids. That is, they may represent DC loads or DC sources connected to the power converter through bidirectional ports. On the other hand, the AC port may be represented by alternating current elements, such as the electrical grid, an AC motor and/or an AC generator. That is, it may represent an AC load or an AC source connected to the power converter through a bidirectional port.

Figure 2A:
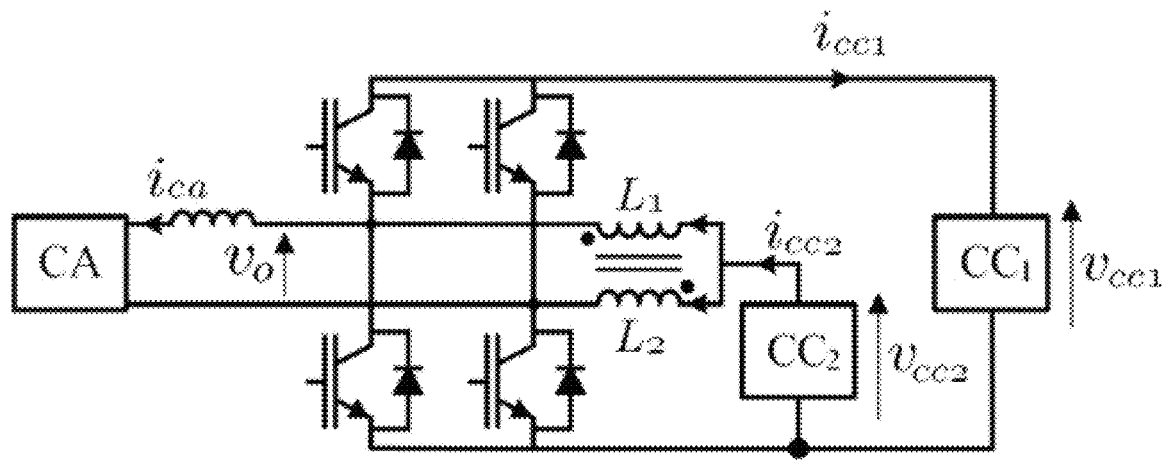
FIG. 2a shows a diagram of the power converter topology according to a preferred embodiment of the invention in a single-phase conversion system.
Figure 2B:
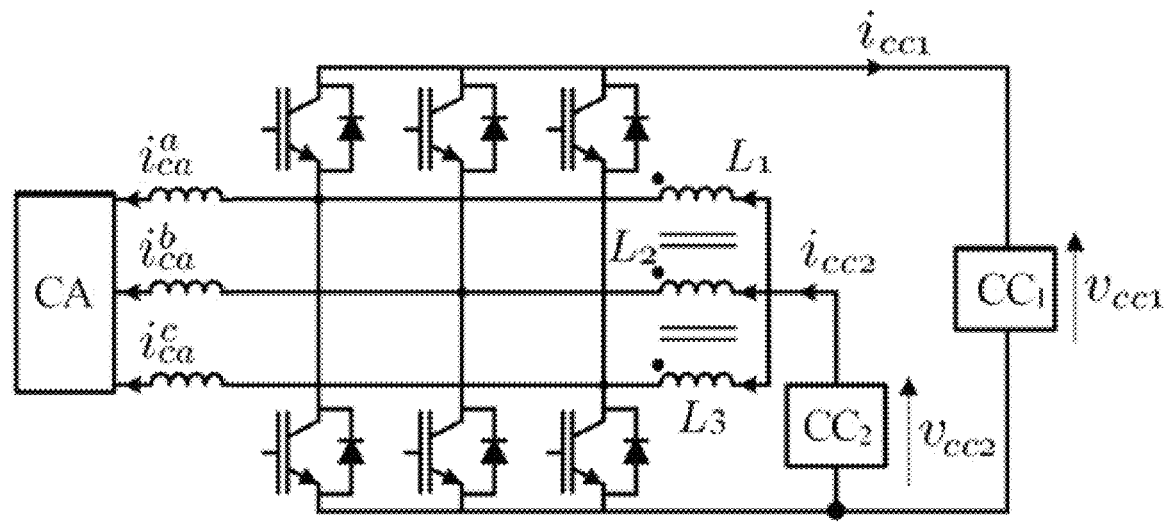
FIG. 2b shows a diagram of the power converter topology according to a preferred embodiment of the invention in a three-phase conversion system.
Figure 2C:
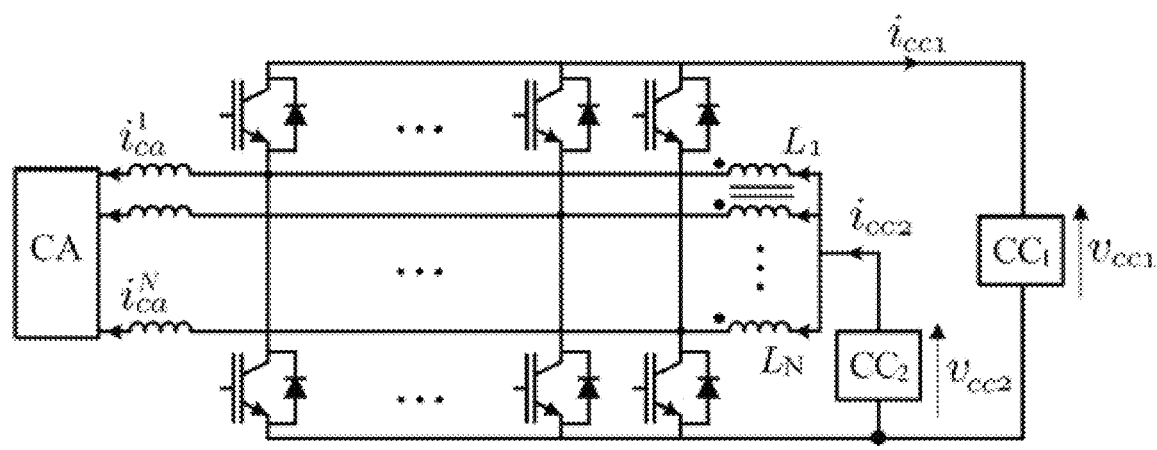
FIG. 2c shows a diagram of the power converter topology according to a preferred embodiment of the invention in a polyphase conversion system.

Similarly, FIGS. 2a, 2b and 2c show diagrams of the power converter topology according to a preferred embodiment of the invention which incorporates inductor arrangements with coupling, implemented in single-phase, three-phase and polyphase systems, respectively. As can be appreciated, the main difference with FIG. 1a-c is that the power converters in FIG. 2a-c incorporate an arrangement of inductors ($L_e$) which do not contribute to the power transfer and only increase the conduction and switching losses of the converter as specified above.

Based on the power converter topologies of the invention, according to the embodiments shown in FIGS. 1a-c and 2a-c, the results of two application examples associated with the use of said embodiments are exhibited below.

Example 1

In a first example of application, a first embodiment of the power converter of the invention was implemented in a single-phase system with an array of inductors without coupling. Said power converter is arranged in a system made up of batteries, capacitors and an AC source. Particularly, the measurements represent the operation of the power converter connecting a low voltage DC source, equivalent to a battery, with the AC grid. The operating parameters of the system are shown in Table I.

| Description | Parameter | Value |
| --- | --- | --- |
| Grid nominal voltage | $V_0$ | 25 V/50 Hz |
| Rated power | $P_o^{max}$ | 100 W |
| AC port inductance | Lca | 5 mH |
| CC1 port capacitance | C | 3.3 mF |
| Capacitor voltage at port CC1 | $Vcc_1$ | 50 V |
| CC2 port inductors | $L_1$ and $L_2$ | 5 mH/25 mΩ |
| Battery voltage at Port CC2 | $Vcc_2$ | 15 V |
| Sampling Rate | $f_s^{max}$ | 20 kHz |

Figure 3A:
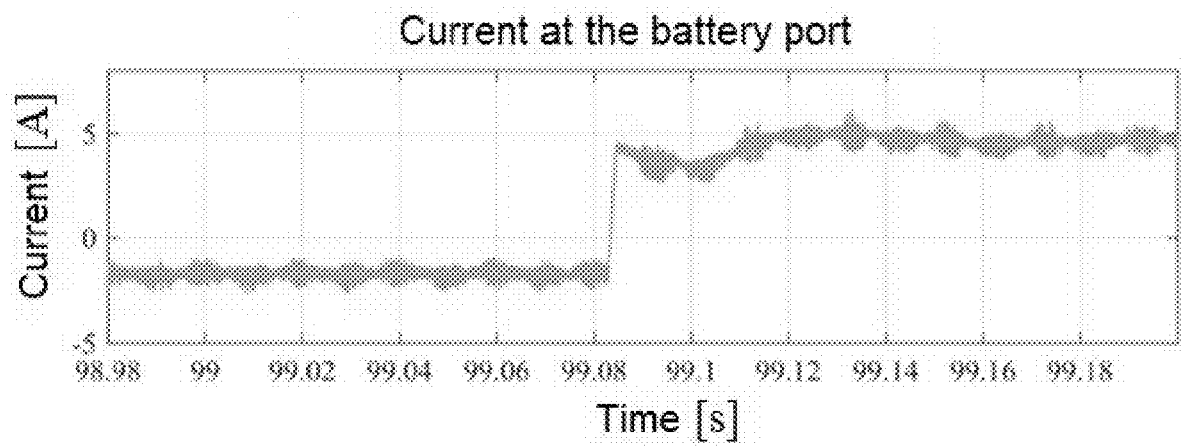
FIGS. 3a-e show experimental results of the power converter operation according to one embodiment of the invention.
Figure 3B:
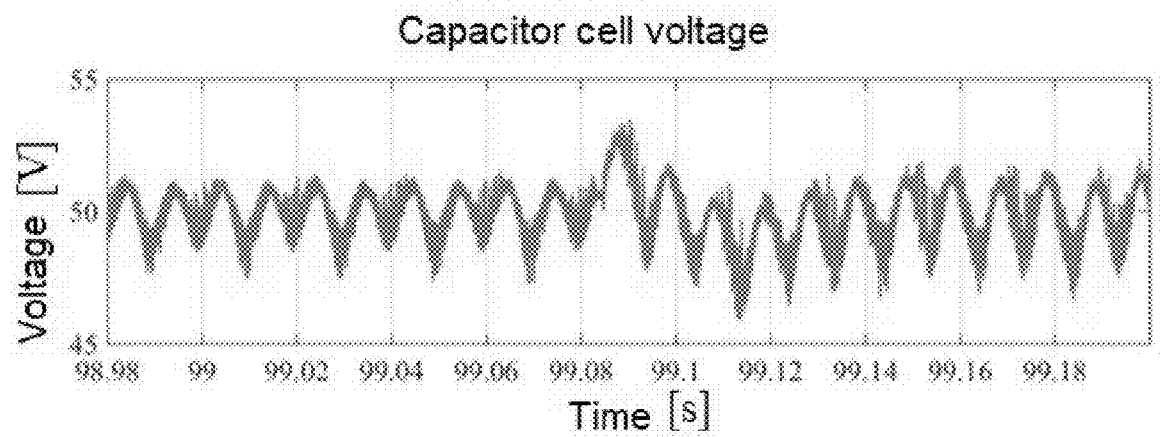
Figure 3C:
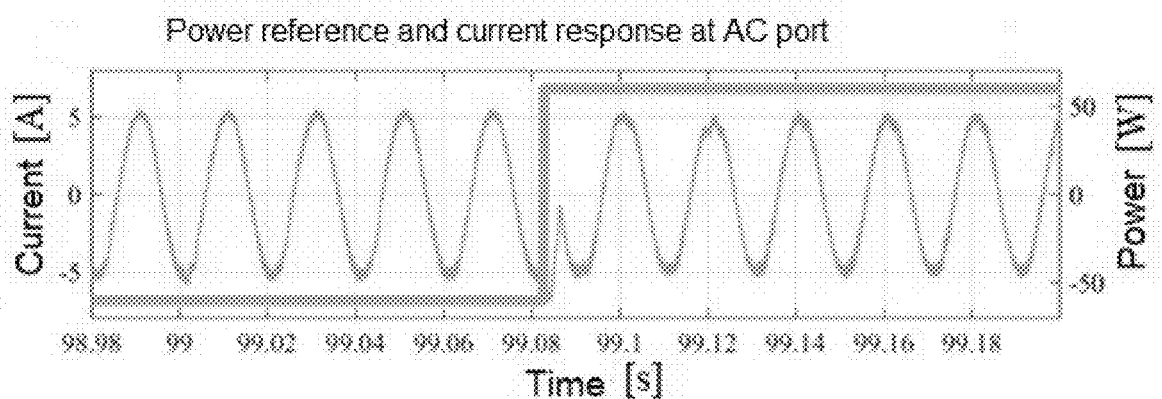

FIG. 3a-c show how the proposed converter responds to a reversal in the power flow between the ports. In this case, it is seen how the direct current port corresponding to the DC source or battery ($DC_1$) goes from absorbing power from the grid (load) to delivering power (unload) thereof (see FIG. 3a), while the remaining DC port voltage ($DC_2$) remains constant (see FIG. 3b). FIG. 3c shows the current and power in the AC port, evidencing the effects of the reversal on the power flow. This scenario is relevant due to three main points:

Shows the bidirectional capability in terms of the converter ports power.
It shows the converter's ability to inject power into the grid from a lower voltage element, such as the battery.
It shows how the $DC_2$ port remains around its reference, so the source or load that is connected to said port is not affected by the power exchange.

Consequently, FIG. 3a-c demonstrate the correct operation of the converter in light of sudden changes in generation and consumption associated with the place of operation.

Figure 3D:
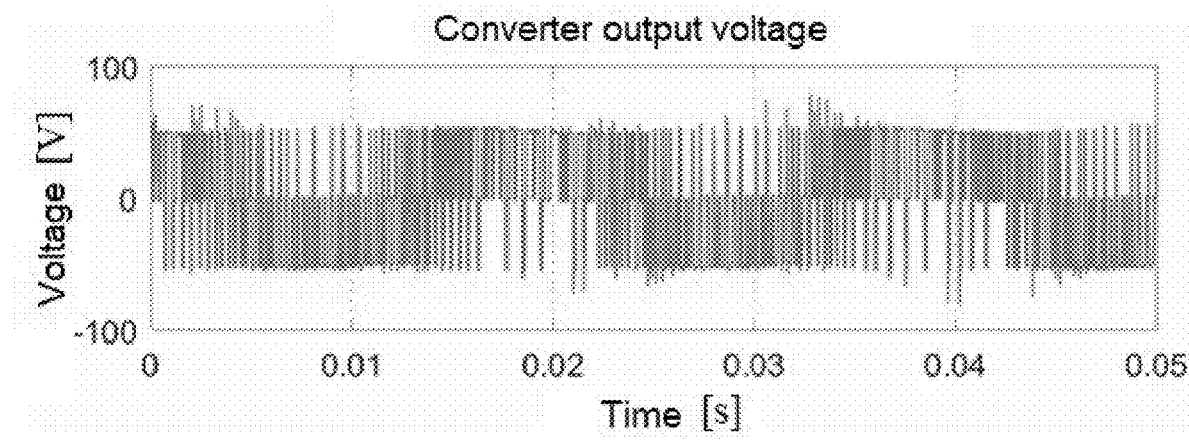
Figure 3E:
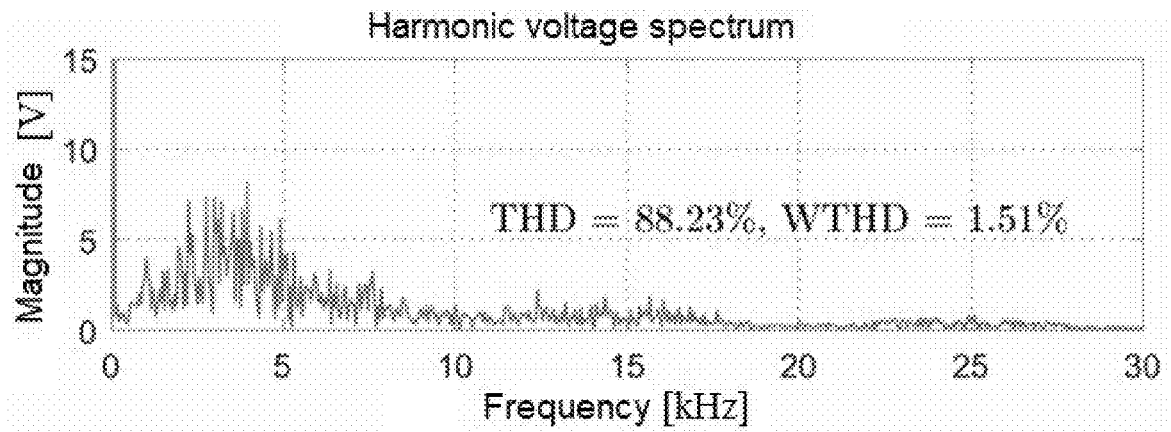

FIGS. 3d and 3e show the voltage generated by the power converter at the grid connection port (see FIG. 3d, Converter Output Voltage) and its respective harmonic content (see FIG. 3e, Voltage Harmonic Spectrum). The plots in FIG. 3d-e, together with FIG. 3a-c, prove that the power converter of the invention may generate a sinusoidal current to exchange power with the two DC ports ($DC_1$, $DC_2$).

On the other hand, FIG. 3e provides the high harmonic content at low frequencies generated in the AC port, which in commercial applications may cause problems when complying with current regulations for converters connected to the electrical grid. In effect, a Total Harmonic Distortion (THD) of 88.23% and a Weighted Total Harmonic Distortion (WTHD) of 1.51% are obtained.

Example 2

Considering the above, in a second application example, a preferred embodiment of the invention power converter is implemented, which operates mainly with two differences with respect to the first application example.

Firstly, according to the present preferred embodiment, the inductors of the inductor array are coupled inductors and, given this, the currents to be supported by the real-scale converter are reduced avoiding the efficiencies that hinder the commercial implementation of the first application example. Secondly, the controller used in the present embodiment includes a modulation stage which entails a reduced harmonic spectrum that may easily meet the operating requirements of the current AC grids. Then, the simulated operation results of the power converter according to the preferred embodiment with coupled inductors and modulation stage, are shown in FIG. 4a-c.

Figure 4A:
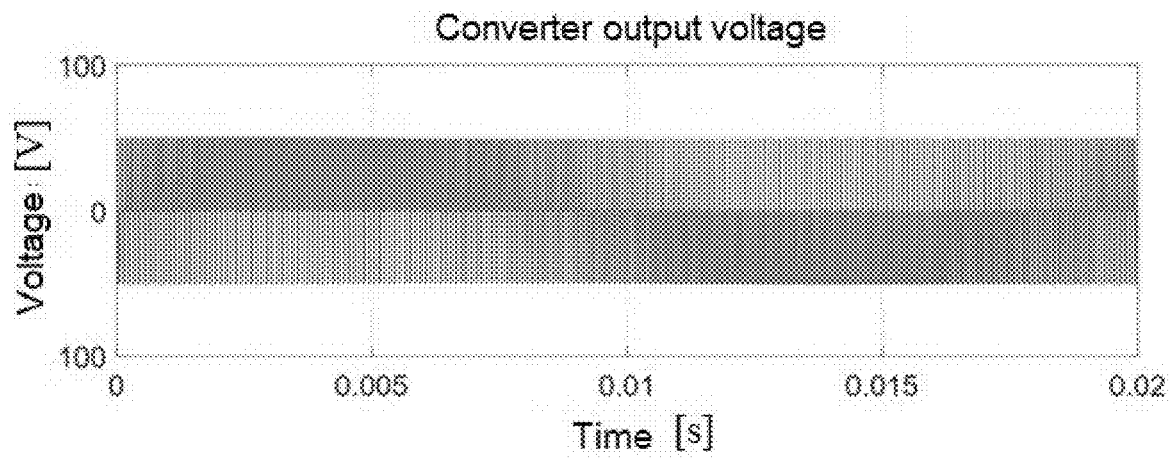
FIGS. 4a-c show experimental results of the power converter operation according to a preferred embodiment of the invention.
Figure 4B:
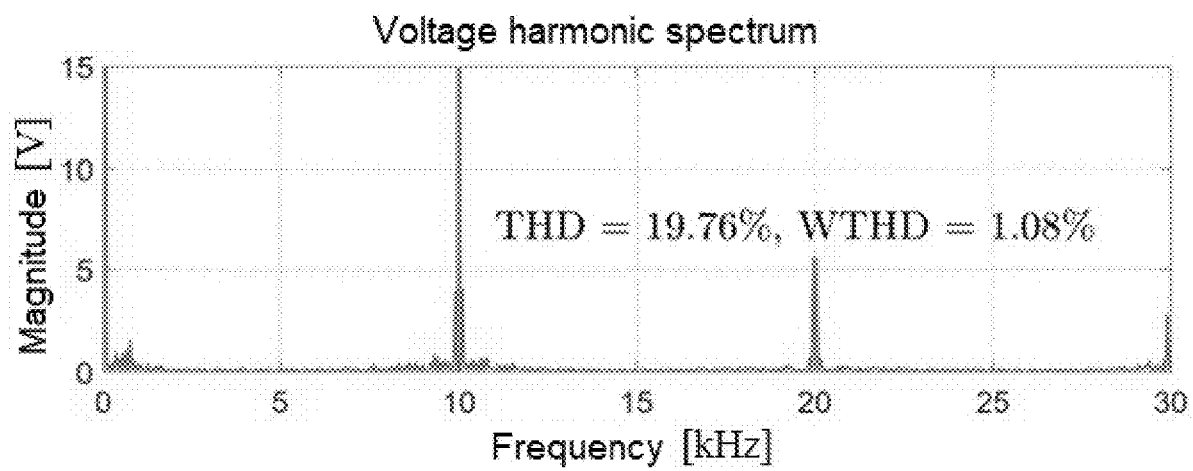

In this context, FIGS. 4a and 4b show the voltage generated by the converter (see FIG. 4, Converter Output Voltage) considering the control method plus the modulation stage of the preferred embodiment of the invention. Furthermore, FIG. 4b shows that the low-frequency harmonic content is reduced and that the relevant harmonics are only found in multiples of the switching frequency. Indeed, the TDH is 19.76% and the WDH is 1.08%. Given this, the harmonic content may be easily filtered and consequently comply with the connection regulations for this type of power converters.

Figure 4C:
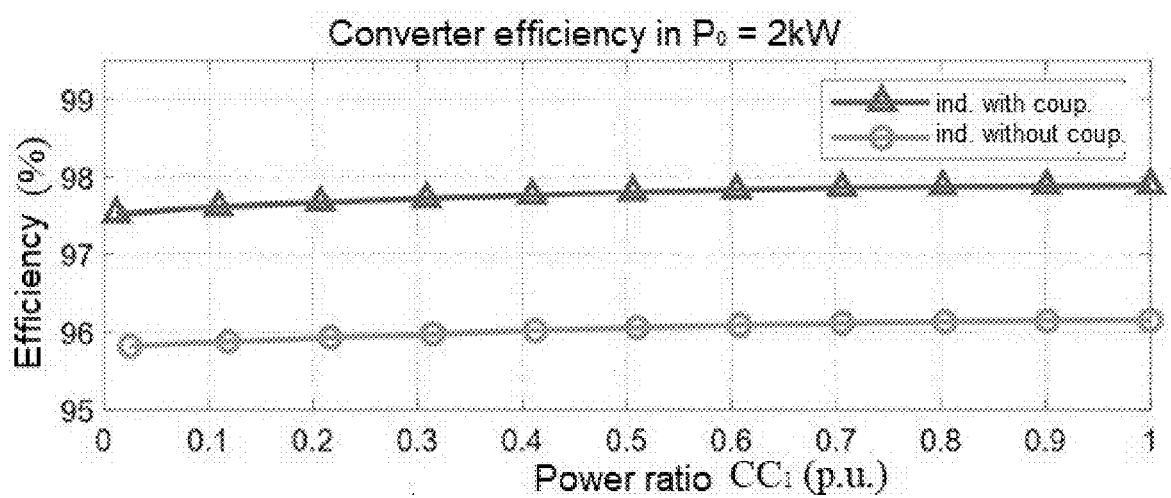

On the other hand, FIG. 4c shows the increase in the total efficiency of the converter for the entire operating range, comparing the embodiment that implements inductors with coupling and the embodiment that implements inductors without coupling. This increase in efficiency is due to the fact that by using coupled inductors, the current circulating through the converter is considerably reduced, which leads to lower losses in both conduction and switching. This modification on the embodiment of the first application example also allows the size of the inductors to be reduced, which produces an improvement in the total power density of the solution.

In conclusion, the results presented show how the proposed invention allows the implementation of a three-port power conversion system suitable for use in photovoltaic generation and energy storage systems connected to the grid. In particular, the preferred embodiment of the solution with coupled inductors and modulation stage, broadly complies with grid connection standards and allows obtaining an efficiency curve competitive with current market solutions.

SUMMARY

The invention relates to a multi-port power converter and a power conversion system that implements the power converter of the invention, to connect at least two elements in direct current (DC) with at least one element in alternating current (CA), making use of a single simultaneous conversion stage. Furthermore, the invention relates to the use of the power conversion system.

The invention claimed is:

1. A multi-port power converter, comprising: an array of power transistors, at least one arrangement of inductors, and three bidirectional ports;
   wherein the three bidirectional ports comprise: a first direct current (DC) port configured to connect to a first DC element; a second DC port configured to connect to a second DC element; and an AC port configured to connect to at least one single-phase or polyphase alternating current (AC) element;
   wherein:
      the first DC port is connected to the AC port using the array of power transistors forming a Full-Bridge topology; and
      the second DC port is connected to the first DC port using the array of power transistors and the at least one arrangement of inductors forming an interleaved Half-Bridge Buck-Boost topology;
   wherein the power converter further comprises:
      a multivariable control subsystem configured to control respective currents in the at least three bidirectional ports through voltage signals to be generated with each branch of the power converter and through on and off signals of each of the power transistors of the array of power transistors, wherein the voltage signals are generated based on instantaneous power requirements in each of the three bidirectional ports; and
      wherein each inductor of the at least one arrangement of inductors is connected between one of the phases of the first AC port and the second DC port, wherein each inductor is subjected to a sinusoidal voltage of magnitude and frequency predetermined by the first AC port and the second DC port, depending on the at least one AC element to be connected to the AC port and a voltage to be defined in the second DC port;
   wherein the power converter is configured to connect the at least one AC element with the at least two DC elements in a single-stage multiport power converter such that power conversion between the three bidirectional ports occurs simultaneously by operation of the array of power transistors.

2. The multi-port power converter according to claim 1, wherein each inductor of the at least one arrangement of inductors is a inductively coupled to another inductor of the at least one arrangement of, wherein coupled inductors, when subjected to the sinusoidal voltage, introduces inverse coupling between magnetic fluxes that are generated between the AC port and the second DC port, increasing the impedance associated with the at least one AC element and reducing a circulating electric current generated during the operation of the power converter.

3. The multi-port power converter according to claim 1, wherein the multivariable control subsystem comprises at least one modulation stage to set a harmonic spectrum of an output voltage of the power converter at predetermined values, wherein the at least one modulation stage receives the voltage signals to be generated with each branch of the power converter and generates the on and off signals of the power transistors.

4. The multi-port power converter according to claim 1, wherein:
   the power converter comprising four transistors and two inductors for use in a single base system;
   the power converter comprising six transistors and three inductors for use in a three phase system; or
   the power converter is multiplied by N transistors and N inductors for use in in an N-phase polyphase system.

5. The multi-port power converter according to claim 1, wherein the at least one AC element is one or a combination of the electrical grid, an AC motor, an AC generator, an AC load or an AC source.

6. The multi-port power converter according to claim 1, wherein the first DC element and/or the second DC element are one or a combination of photovoltaic systems, batteries, capacitors, ultracapacitors, fuel cells, DC microgrids, DC loads or DC sources.

7. The multi-port power converter according to claim 1, wherein the second DC port is decoupled from the AC port via the at least one arrangement of inductors and therefore allows the connection of a low voltage DC element compared to the first DC port.

8. A multi-port power conversion system, comprising:
   a multi-port power converter according to claim 1;
   the single-phase or polyphase alternating current (AC) element connected to the AC port of the power converter; and
   the first DC element is connected to the first DC port of the power converter and wherein the second DC element is connected to the second DC port of the power converter;
   wherein the first DC port is connected to the AC port of the power converter through the Full-Bridge topology, and wherein the second DC port of the power converter is connected to the first DC port of the power converter through interleaved Half-Bridge Buck-Boost topology;

wherein the currents in the three bidirectional ports are controlled by the multivariable control subsystem of the power converter through voltage signals to be generated with each branch of the power converter and through on and off signals of each of the power transistors of the power transistor arrangement, wherein the voltage signals are generated based on instantaneous power requirements in each of the at least three bidirectional ports;

wherein each inductor of the at least one arrangement of inductors is connected between the AC port and the second DC port;

wherein each inductor of the at least one arrangement of inductors is subjected to a sinusoidal voltage of magnitude and frequency predetermined by the AC port and the second DC port, and wherein the power converter connects the AC element with the two DC elements in the single-stage multiport power converter.

9. The multi-port power conversion system according to claim 8, wherein each inductor of the at least one arrangement of inductors is a coupled to another inductor, wherein an arrangement of coupled inductors when subjected to the sinusoidal voltage, introduces reverse coupling between magnetic fluxes that are generated between the AC port and the second DC port, increasing the impedance associated with the AC element and reducing a circulating electric current that is generated in the power converter during its operation.

10. The multi-port power conversion system according to claim 8, wherein the multivariable control subsystem comprises a modulation stage to set a harmonic spectrum of an output voltage of the power converter at predetermined values, wherein the modulation stage receives the voltage signals to be generated with each branch of the power converter and generates the on and off signals of the power transistors.

11. The multi-port power conversion system according to claim 8, wherein:

the power converter comprises four transistors and two inductors for use with a single phase system;

the power converter comprises six transistors and three inductors for use with a three phase system; or the power converter is multiplied by N transistors and N inductors for use in an N-phase polyphase system.

12. The multi-port power conversion system according to claim 8, wherein the AC element is selected from one of the electrical grid, an AC motor, an AC generator, an AC load or an AC source.

13. The multi-port conversion system according to claim 8, wherein the first DC element and/or the second DC element are one or a combination of photovoltaic systems, batteries, capacitors, ultracapacitors, fuel cells, DC microgrids, DC loads or DC sources.

14. The multi-port power conversion system according to claim 8, wherein the second DC port is decoupled from the AC port via the at least one arrangement of inductors and therefore allows the connection of a low voltage DC element compared to the first DC port.

\* \* \* \* \*